United States Patent [19]

Abbott et al.

[11] Patent Number: 5,116,400
[45] Date of Patent: May 26, 1992

[54] APPARATUS FOR FORMING A POROUS GLASS PREFORM

[75] Inventors: John S. Abbott, Elmira, N.Y.; Mark C. Bertz, Greenville, S.C.; James H. Faler, Wilmington, N.C.; William Schirmer, III, Wilmington, N.C.; John G. Williams, Wilmington, N.C.

[73] Assignee: Corning Incorporated, Corning, N.Y.

[21] Appl. No.: 585,192

[22] Filed: Sep. 20, 1990

[51] Int. Cl.⁵ .................................................. C03B 19/06
[52] U.S. Cl. .................................... 65/144; 65/18.2; 65/1; 65/3.12; 118/321; 118/315; 118/310
[58] Field of Search ................. 65/2, 3.12, 18.1, 18.2, 65/144; 118/309, 310, 315, 321, 326; 422/129; 239/422

[56] References Cited

U.S. PATENT DOCUMENTS

| | | | |
|---|---|---|---|
| 4,135,901 | 1/1979 | Fujiwara et al. | 65/18.2 |
| 4,136,828 | 1/1979 | Anderson et al. | 239/422 |
| 4,203,553 | 5/1980 | Bachman et al. | 239/422 |
| 4,378,985 | 4/1983 | Powers | 65/144 |
| 4,486,212 | 12/1984 | Berkey | 65/2 |
| 4,568,370 | 2/1986 | Powers | 65/18.2 |
| 4,627,867 | 12/1986 | Tanaka et al. | 65/3.12 |
| 4,684,384 | 8/1987 | Berkey | 65/18.2 |
| 4,801,322 | 1/1989 | Suda et al. | 65/144 |
| 4,915,717 | 4/1990 | Watanabe et al. | 65/144 |

FOREIGN PATENT DOCUMENTS

| | | |
|---|---|---|
| 55-23074 | 2/1980 | Japan. |
| 60-46939 | 3/1985 | Japan. |
| 61-36134 | 2/1986 | Japan. |
| 62-96336 | 5/1987 | Japan. |
| 62-162638 | 7/1987 | Japan. |
| 62-162641 | 7/1987 | Japan. |
| 63-74932 | 4/1988 | Japan. |
| 1-9821 | 1/1989 | Japan. |
| 1-138147 | 5/1989 | Japan. |

Primary Examiner—Robert L. Lindsay
Assistant Examiner—John J. Bruckner
Attorney, Agent, or Firm—K. McNeill Taylor, Jr.

[57] ABSTRACT

Apparatus for rapidly forming a porous glass preform is provided in which an array of burners is oscillated along a path parallel to the longitudinal axis of the preform. The oscillation amplitude is limited so that each burner deposits soot on only a portion of the preform, e.g., 20% of the preform. By controlling inter-burner variability and the air flow in the burner-array/preform region, preforms having substantially uniform diameter and axial properties are obtained.

16 Claims, 7 Drawing Sheets

SOOT GRAPH

APPARATUS FOR FORMING A POROUS GLASS PREFORM

BACKGROUND OF THE INVENTION

1. Field of the Invention

This invention relates to a method and apparatus for forming a porous glass preform for use in preparing optical waveguide fibers.

2. Description of the Prior Art

Various techniques are known in the art for forming porous glass preforms. See, for example, Fujiwara et al., U.S. Pat. No. 4,135,901, Anderson et al., U.S. Pat. No. 4,136,828 (the "'828 patent"), Bachman et al., U.S. Pat. No. 4,203,553 (the "'553 patent"), Powers, U.S. Pat. No. 4,378,985 (the "'985 patent"), Berkey, U.S. Pat. No. 4,486,212 (the "'212 patent"), Powers, U.S. Pat. No. 4,568,370 (the "'370 patent"), Berkey, U.S. Pat. No. 4,684,384 (the "'384 patent"), and European Patent Publication No. 154,500.

The basic technique, as shown in the Berkey '212 patent, involves reciprocating a soot-producing burner along the length of a preform, while rotating the preform about its axis. A mandrel or bait rod, which is removed during subsequent processing of the preform, is normally employed to start the process. In some cases, a consolidated glass rod produced from a previously formed preform is used in place of the mandrel.

Over the years, modifications have been made to the basic technique to increase the efficiency with which preforms are produced. For example, a plurality of separately reciprocating burners, spaced at intervals around the periphery of a preform, has been used. Another improvement is illustrated in FIG. 1. As shown in this figure, instead of using a single reciprocating burner, a plurality of ganged burners 13a, 13b, and 13c are mounted on carriage 15 and moved in unison along the length of preform 17. In these ways, substantial increases in soot deposition rates have been achieved.

The use of ganged burners however does have its drawbacks. Specifically, the end portions of preforms produced with multiple burners have properties different from the central portion and thus those end portions cannot be used to produce fiber. Moreover, the length of the unusable portions increases as the number of burners is increased.

This effect is illustrated in FIG. 1, where the spacing between the first and last burners 13a and 13c is D and the distance through which carriage 15 is moved is L. As shown in this figure, when the carriage is at the left hand edge of the blank, a first necked-down area 19 is formed in the region which burner 13c does not reach, and a second necked-down are 21 is formed in the region which both burners 13b and 13c do not reach. Corresponding necked-down areas are formed on the right hand side of the preform.

As a result of these end effects, the usable length of the finished preform is only L-D. Attempts have been made to solve this problem by decreasing the distance between adjacent burners so as to decrease D. This approach has not been successful due to interference between the flames produced by adjacent burners. Accordingly, in the existing prior art reciprocating systems, only a limited number of burners, e.g., three burners, have been ganged together.

In addition to the basic method, a variety of other approaches have been used to produce porous preforms. One such approach involves longitudinal movement of the preform past a group of burners. The Powers '370 and '985 patents, referred to above, use this approach. In particular, these patents disclose collecting soot on a rotating member by moving the member past a series of oscillating burners.

Another approach for producing preforms involves using what is known in the art as a ribbon burner. Such burners have multiple, closely-spaced orifices each of which produces its own flame. In accordance with the ribbon burner technique, neither the burner nor the preform is moved longitudinally. Rather, the orifice spacings, burner configuration, and burner gas flows are chosen so as to produce a continuous soot sheet which deposits soot over the entire length of the preform. The Anderson et al. '828 and Bachman et al. '553 patents describe this approach.

A patent which is particularly relevant to the present invention is the Berkey '384 patent. This patent describes a system for producing preforms in which a plurality of burners are passed along the full length of the preform. In certain embodiments, the system is used to produce multiple preforms simultaneously, with the preforms being located along, for example, the sides of a square and with the burners being located inside the square and moving in a continuous loop parallel to the sides of the square.

In discussing problems with other approaches for forming preforms, the '384 patent mentions and dismisses the idea of using multiple burners and traversing each burner back and forth over a portion of the preform. Specifically, the patent states at column 2, lines 21-26, that if many burners are employed and each is traversed back and forth along only a segment of the entire preform, the soot buildup is not uniform throughout the entire length of the preform since all burners cannot provide precisely the same composition and amount of soot. Thus, the '384 patent specifically teaches away from the present invention.

SUMMARY OF THE INVENTION

In view of the foregoing state of the art, it is an object of the present invention to provide a method and apparatus for forming porous glass preforms. More particularly, it is an object of the invention to form preforms rapidly and with a minimum of wastage due to end effects. It is a further object of the invention to form preforms by means of multiple burners, each of which traverses only a portion of the total length of the preform. It is an additional object of the invention to produce preforms having substantially uniform properties along their lengths using burners which traverse only a portion of the preform.

To achieve the foregoing and other objects, the invention provides an array of burners which is oscillated along a path parallel to the longitudinal axis of a preform, the oscillations having a limited amplitude such that each burner deposits soot on a portion and only a portion of the preform. That is, none of burners deposits soot over the entire usable length of the preform, as was done in prior art systems using a ganged set of burners (see FIG. 1).

More particularly, in terms of its process aspects, the invention provides a method for producing a soot preform which comprises the steps of:

(a) providing an elongated cylindrical starting member;

(b) providing an array of soot-producing burners; and (c) depositing glass soot on the starting member to form the preform by producing relative oscillatory motion between the array of soot-producing burners and the starting member such that each burner in the array deposits soot on only a portion of the usable length of the preform.

The basic elements of the apparatus and process of the invention are illustrated schematically in FIG. 2. As shown in this figure, burner array 23 has a length L and is oscillated through a distance of 2J, i.e., from its center position, the array is oscillated to the right by a distance J, is returned to its center position, is oscillated to the left by a distance J, and then is again returned to its center position to complete one cycle. Preferably, the oscillation amplitude J is equal to or slightly greater than the burner spacing d so as to help ensure uniformity of cumulative deposition. Also, the turn-around points of the burner array are preferably varied in a systematic way, again for the purpose of improving the axial uniformity of the finished preform.

As shown in FIG. 2, a preform prepared in accordance with the invention will have a non-usable portion 25 at each end. The length of this portion will be J, with J subject to the constraint mentioned in above, viz. J approximately equal to d.

For comparison, the non-usable portion of a preform prepared in accordance with the prior art method of FIG. 1 has a length equal to 2D. For an oscillation amplitude J which is approximately equal to the burner spacing d, and for a ganged set of three burners having an overall length D equal to 2d, the difference in non-usable length between the prior art technique of FIG. 1 and the present invention is on the order of 2d, which represents a significant improvement. Moreover, if one tries to increase the soot deposition rate of the prior art system by using more ganged burners, the reduction in non-usable length provided by the present invention becomes even more pronounced, e.g., for four ganged burners in the prior art technique, the improvement is on the order of 4d, for five ganged burners, it is on the order of 6d, and so forth.

This difference between the present invention and the prior art can also be viewed in terms of an efficiency parameter defined as the ratio of the preform's usable length to its total length. If the number of burner and the burner spacing for both the prior art technique and the technique of the present invention are n and d, respectively, and if the traverse distance for the prior art is L and the jog distance for the present invention is d, then the usable length and total length for two approaches become:

Usable Length (Prior Art) = $L - (n-1)^* d$

Total Length (Prior Art) = $L + (n-1)^* d$

Usable Length (Invention) = $(n-1)^* d$

Total Length (Invention) = $(n+1)^* d$

The efficiencies of the two approaches then become:

Efficiency (Prior Art) = $[L-(n-1)^* d]/[L+(n-1)^* d]$

Efficiency (Invention) = $(n-1)^* d/(n+1)^* d = (n-1)/(n+1)$

Since preform length is in general fixed either by machine limitations and/or by downstream processing constraints, high deposition rates in general correspond to increases in the value of n. As the above efficiency expressions show, the efficiency of the prior art technique decreases a n increases, while in contrast, as n increases, the efficiency of the present invention approaches 1.

In order to produce a preform having substantially uniform properties over its usable length, the apparatus of the invention preferably includes the following features. First, it is important to use a burner array composed of burners having as similar characteristics as possible. In practice, it has been found that the variability between burners can be reduced by ensuring that the majority of the burner's pressure drop occurs in that portion of the burner where the variability from burner to burner is least.

For example, many of the flows through a conventional soot deposition burner proceed from an inlet consisting of a single port to an outlet consisting of a plurality of orifices. Because of the plurality of outlet orifices, the variability between individual orifices tends to average out over the set of orifices so that the variability between burners at the outlet end tends to be relatively small. On the other hand, since a single port is used at the inlet, the variability between burners at this end tends to be higher than at the outlet end. Accordingly, to reduce the overall variability between burners, it is preferable to have the majority of the burner's pressure drop occur at the outlet end. This can be readily achieved by increasing the cross-sectional area of the inlet port.

In addition to reducing inter-burner variability, it has also been found preferable to use gas, oxygen, and reactant recipes which result in cooler soot temperatures. Also, a recipe which produces a relatively low density soot during the initial stages of the laydown procedure has been found to be helpful. As known in the art, lower density soot can be achieved by using lower gas and oxygen flows and cooler temperatures can be achieved by using higher reactant flows and/or lower gas and oxygen flows, the specific recipe used for any particular application being a function of the characteristics of the burner array used and the desired chemical composition of the preform.

Improvements in uniformity have also been found to result from enclosing the soot depositing apparatus in a housing and controlling the air flows through the housing. In particular, the air flows in the region of the burner array and the preform are controlled so that those flows are 1) relatively uniform over the length of the preform and 2) substantially perpendicular to the longitudinal axis of the preform.

These air flows can be achieved through the use of a diffuser at the outlet end of the burner-array/preform region which has a length equal to or greater than the length of the preform. In addition, the air entering the burner-array/preform region is also preferably controlled so as to be in substantial laminar flow. An array of orifices, e.g., a honeycomb structure, can be used for this purpose. In the preferred embodiments of the invention, air flows through the honeycomb, past the burner array, past the preform, and out of the burner-array/preform region through the diffuser.

It addition to the above features, when the burner array and the preform are oriented in a vertical direction, it is desirable to employ one or more high output end heaters in the region of the bottom of the preform to minimize the effects of thermal gradients along the length of the preform. Although end heaters have been used in the past in the preparation of preforms, such end heaters have not been of the high output type and have not been used to minimize the effects of thermal gradients resulting from orienting the preform in a vertical direction. Also, when used in a vertical orientation, the magnitude of the horizontal air flow in the burner-array/preform region should be selected (increased) so as to minimize non-uniformities in the preform due to convective air flows along the length of the preform.

The accompanying drawings, which are incorporated in and constitute part of the specification, illustrate a preferred embodiment of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
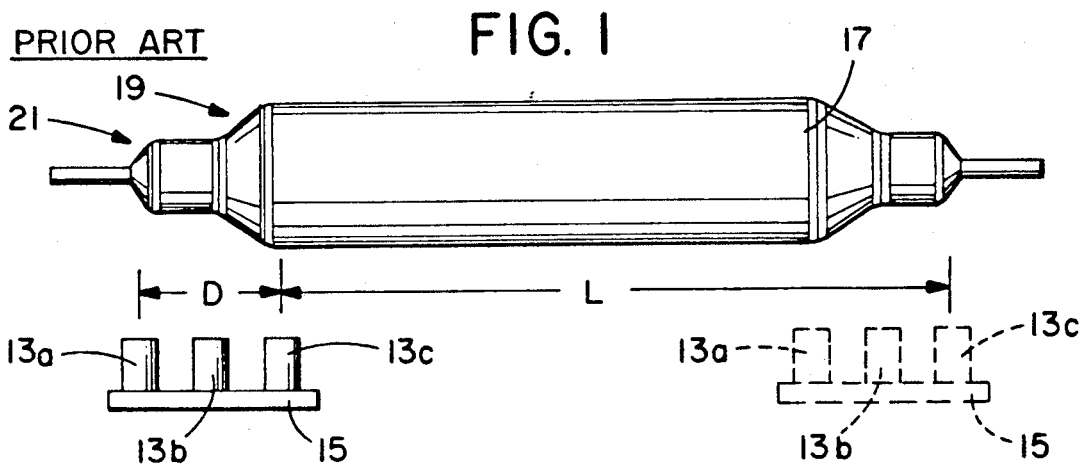
FIG. 1 is a schematic diagram of a prior art technique for producing porous glass preforms.
Figure 2:
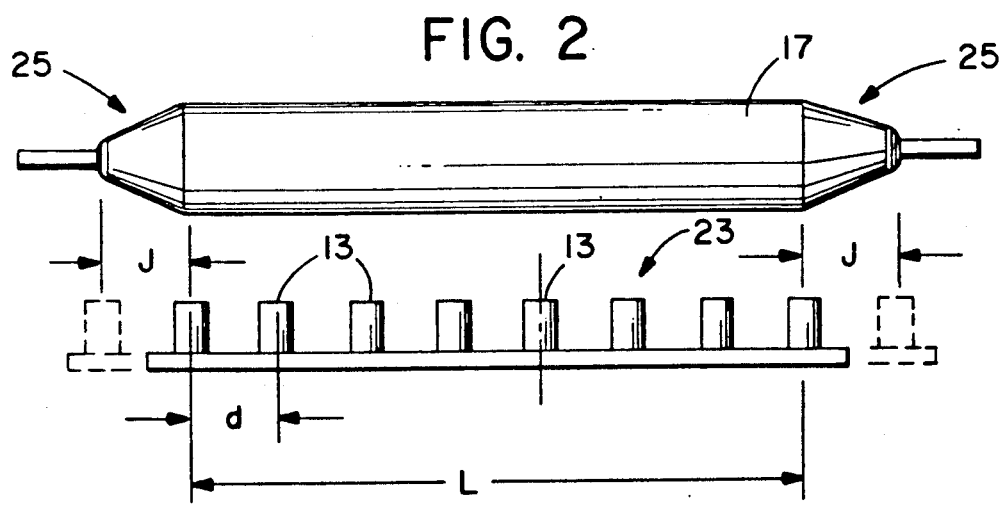
FIG. 2 is a schematic diagram of the technique of the present invention for producing such preforms.

As discussed above, the present invention relates to the rapid production of porous glass preforms for use in preparing optical waveguide fibers. The invention is applicable to preforms for producing both single mode and multimode fibers. It can be used to prepare the entire preform or specific portions of the preform.

For example, a particularly advantageous use of the invention is in the application of cladding to a consolidated core rod, a process known in the art as cane overcladding. When used in this way, the soot produced by the burner array will have a constant composition, e.g., it will typically be pure silica. On the other hand, when used to produce the portion of a preform which will become the core of a fiber, the soot produced by the burner array will typically be a mixture of silica and one or more dopants. Also, when used in this way, the composition of the soot may be changed as different parts of the preform are laid down so as to generate an index of refraction profile of a desired form.

Suitable apparatus for practicing the present invention is shown in FIGS. 3-6. With this apparatus, preforms can be produced at rates up to three times greater than those achieved with prior art equipment employing burners which traverse the entire length of the blank. Moreover, because of the high air flows used with this apparatus (see discussion below), the apparatus tends to remain relatively clean compared to conventional equipment, which again improves the apparatus' productivity, in this case through a reduction in the clean-up time needed between runs.

In overview, the apparatus of FIGS. 3-6 includes housing 33 in which are located preform 17, burner array 23, manifold 31 for supplying process gases to the burner array, carriage 35 for reciprocating (oscillating) the burner array, high output end heaters 77 at the bottom of the preform, conventional low output end heater 85 at the top of the preform, and honeycomb 55, diffuser 43, and collection tank 45 for providing uniform air flow in the burner-array/preform region 67 of the apparatus.

Preform 17 is held in a stationary, vertical orientation within housing 33 by chucks 27 and 29. During soot laydown, the preform is rotated about its longitudinal axis by means of a motor (not shown) which rotates upper chuck 27 and which is contained in support housing 47. Support housing 47 also includes weighing apparatus, e.g., a balance, for monitoring the progress of the soot laydown process.

Burners 13 are mounted on manifold 31 and are preferably equally spaced from one another. In practice, a burner spacing on the order of 4 inches has been found to work successfully. Larger or smaller spacings can, of course, be used if desired. In the experiments described below, manifold 31 had an overall length of 44 inches and carried a total of 11 burners. Again, more or less burners and a greater or smaller length for manifold 3 can be used in the practice of the invention.

Figure 3:
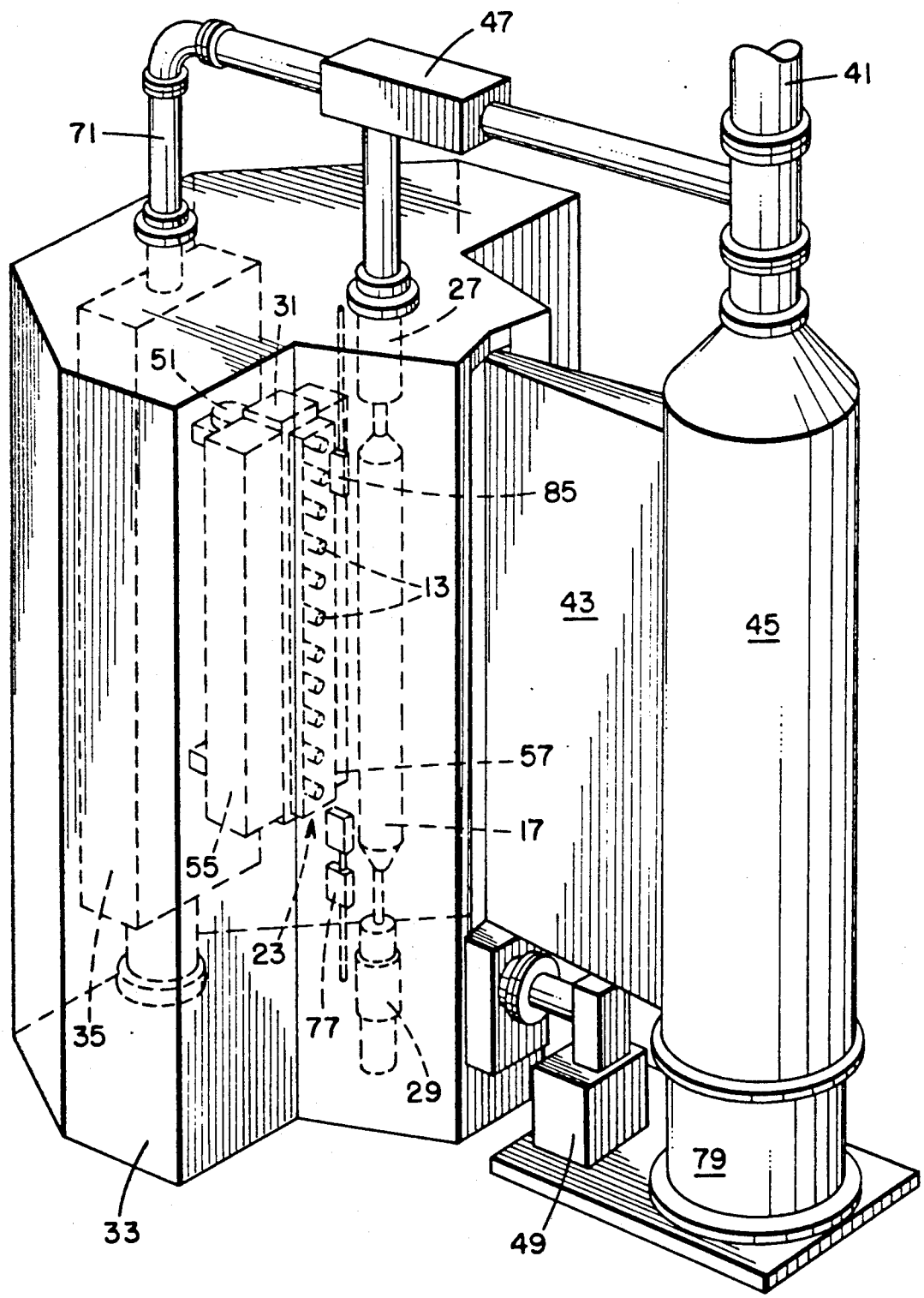
FIG. 3 is a perspective view of suitable apparatus for practicing the present invention.
Figure 4:
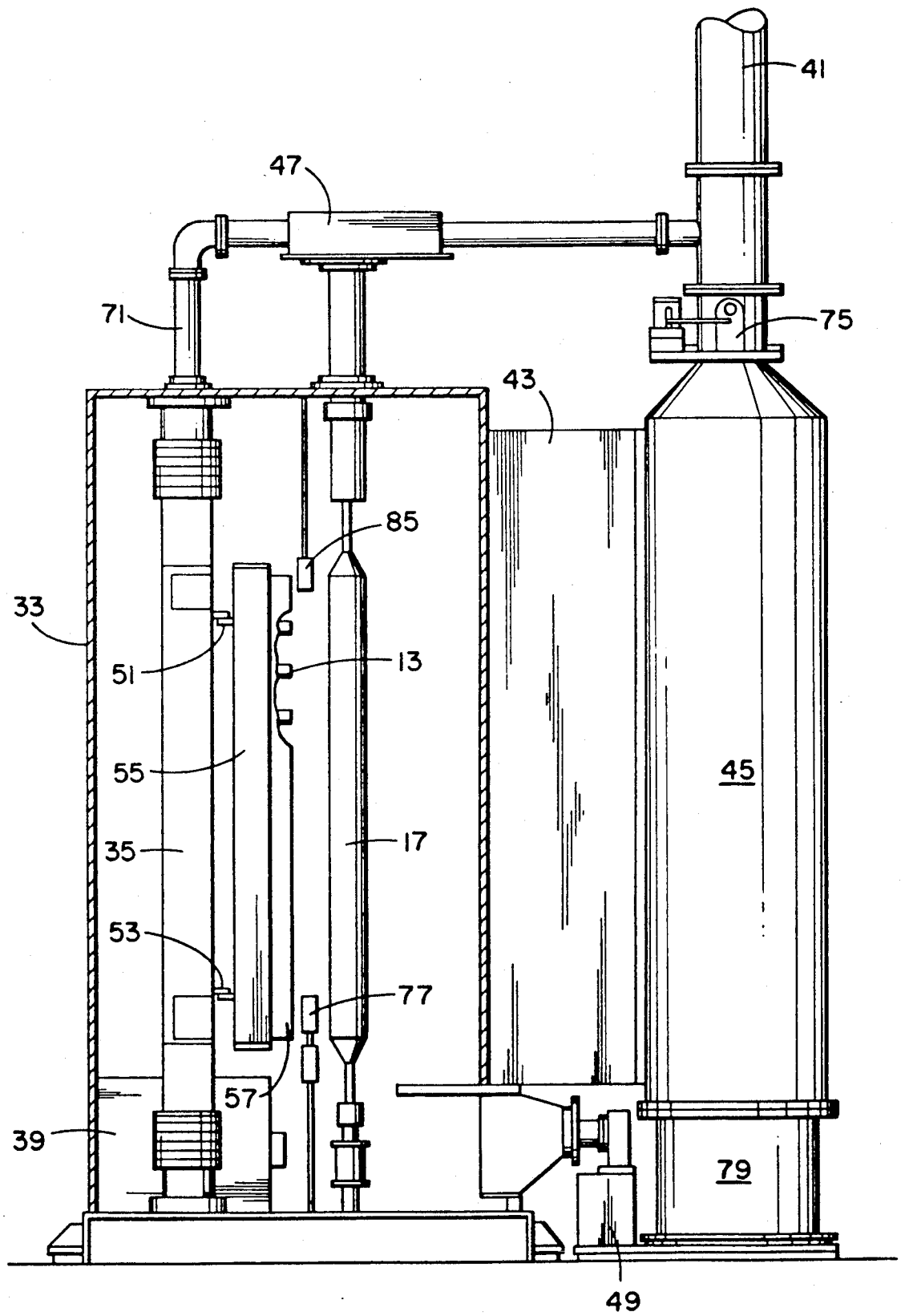
FIG. 4 is a side view, partially in section, of the apparatus of FIG. 3.

As shown in FIGS. 3 and 4, the burners can be fitted with a burner cover 57 which protects the burners from the heat radiated by the preform and thus allows the burners to run at a cooler temperature. The high air flows in the region of the burners (see below) also help in maintaining cool burner temperatures. Alternatively, as illustrated in FIGS. 5 and 6, the burners can be operated without a cover.

Manifold 31 supplies process gases to each of burners 13 and is connected at its upper end to a conventional source of such gases (not shown). If desired, the process gases can be supplied to the bottom of the manifold or to both the top and the bottom simultaneously. Manifold 31 should preferably include large internal chambers (channels) to minimize pressure drops within the manifold and thus ensure an equal supply of process gases to each of the burners.

Figure 5:
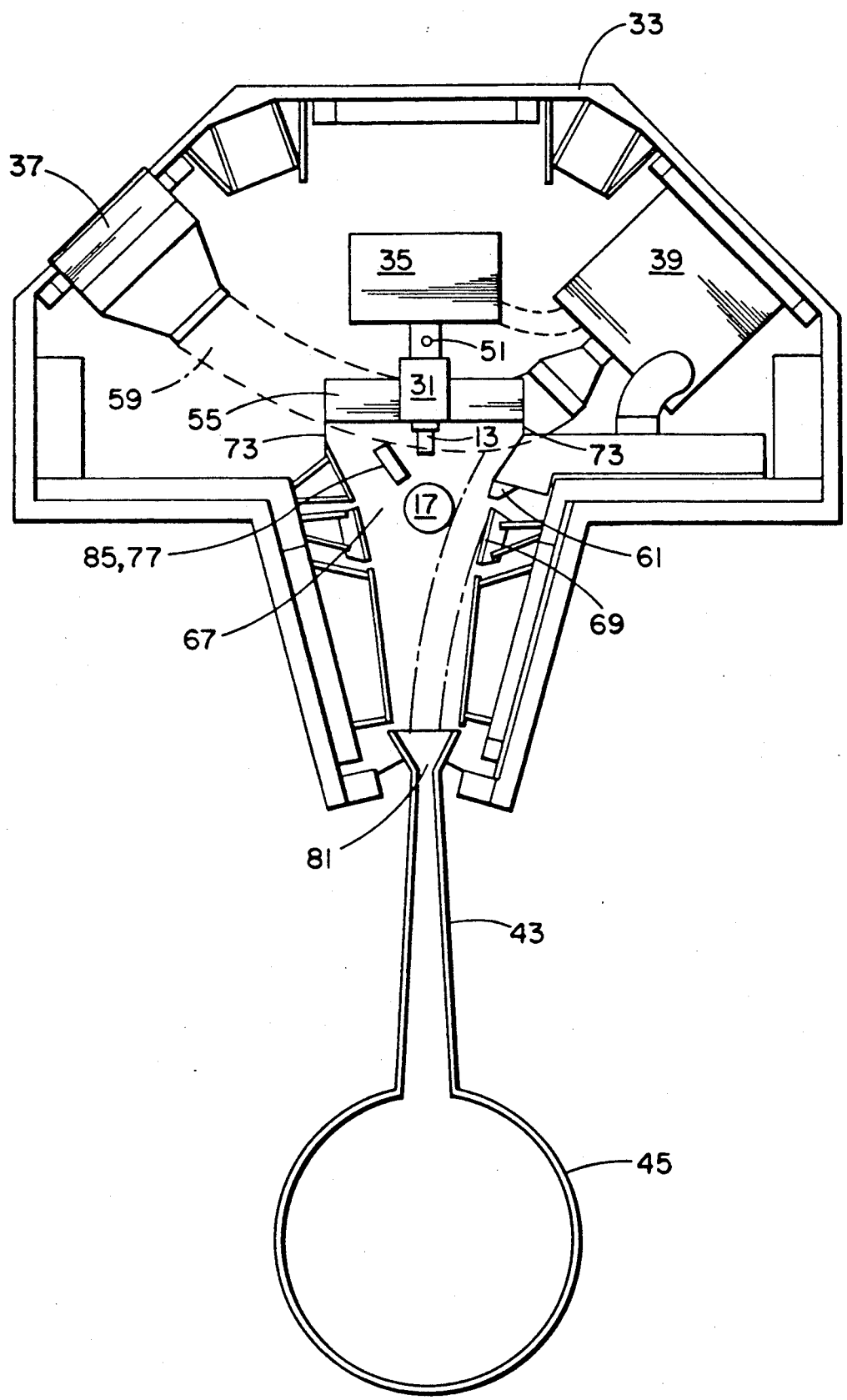
FIGS. 5 and 6 are top views, partially in section, of the apparatus of FIG. 3 with the burner array in its operative and insertion/removal positions, respectively.
Figure 6:
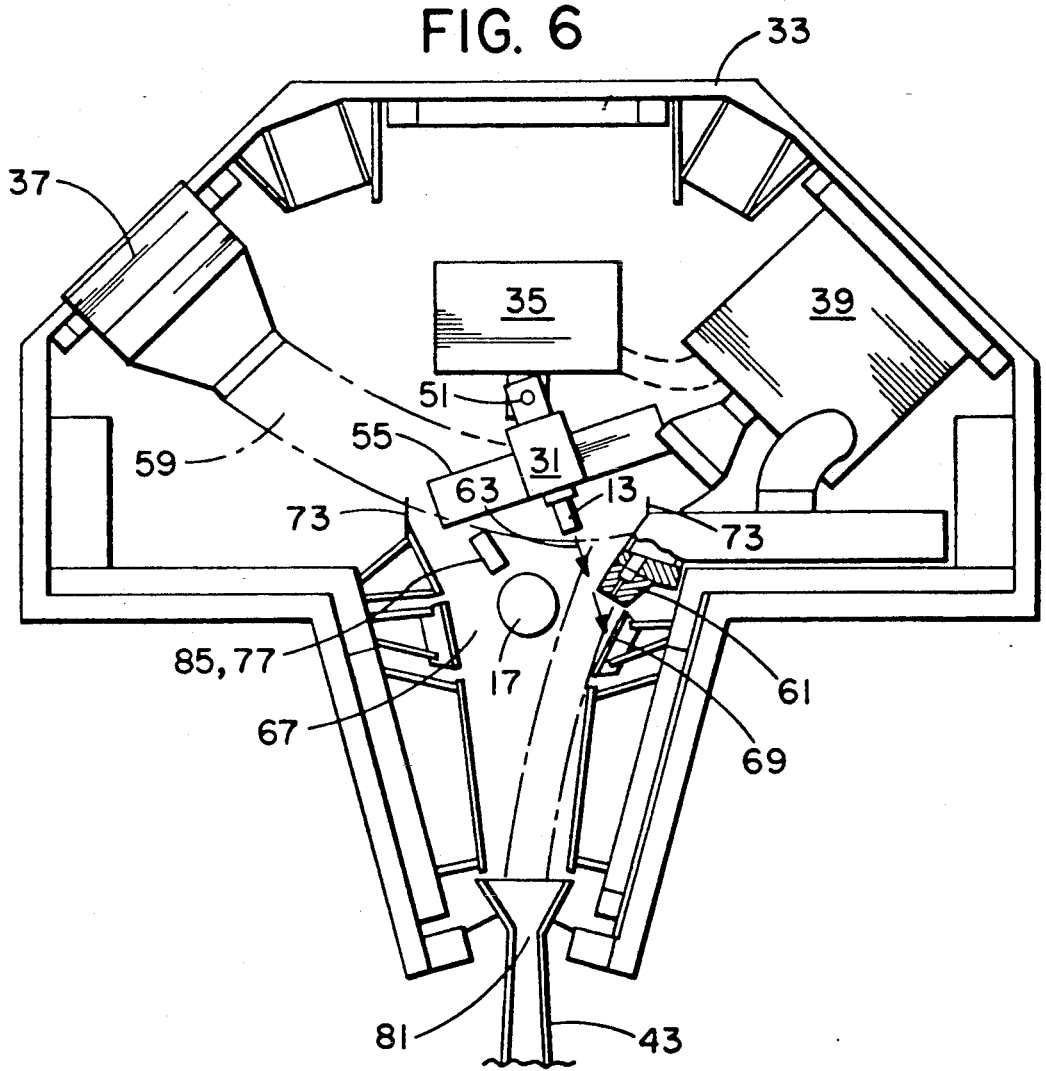

To allow for 1) the introduction of a starting member at the beginning of the laydown process, e.g., a bait rod, mandrel, or consolidated core rod, and 2) the removal of the porous glass preform at the end of the laydown process, carriage 35 and manifold 31 are connected to one another by pivot mechanism 51 which allows burners 13 to be rotated from the position shown in FIG. 5 (the operating position) to the position shown in FIG. 6 (the insertion/removal position). When in the insertion/removal position, burners 13 are directed towards the walls of housing 33, specifically towards internal wall 69. To prevent damage to the internal surfaces of the housing, an air deflection system, consisting of filter 37, conduit 59, housing protection blower 39, and distribution manifold 61, is used to deflect the flames and soot from burners 13 towards diffuser 43 and thus away from the walls of housing 33.

Burner array 23 is oscillated along a path parallel to preform 17 by means of carriage 35. Oscillation of carriage 35 is achieved by means of a drive motor and a leadscrew and ballnut assembly with a universal joint. The drive motor is computer controlled so that the turn-around points for the burner array can be varied in a preselected pattern of the type described below. Carriage 35 preferably is equipped with self aligning linear bearings which are not subject to jamming of one ball in its race against another ball. Other mechanisms for oscillating the burner array can of course be used if desired.

As discussed above, the amplitude of the burner array's oscillation is smaller than the overall length of the preform so that each burner traverses only a portion of the preform, e.g., 20% of the preform. Oscillation of the burner array is necessary since the deposition patterns of the individual burners do not combine into a single uniform pattern and thus will not produce a smooth cylindrical preform.

In oscillating (jogging) the apparatus back and forth to even out the deposition, the following considerations need to be taken into account:

1. The deposition rate and soot density depend on the local surface temperature of the preform and when a jog to, for example, the right ends and the apparatus pauses before jogging back to the left, at that point of maximum travel the hot deposition stream will cause the soot to densify and the local diameter to decrease. This decrease is due to both the pause and the fact that after the return jog starts the hot stream will initially pass over an axial position which has not had a chance to cool down. Accordingly, the length of the jog must be varied so that the turn-around points vary in location and are evenly spaced along the blank.

2. Once a decrease in diameter has occurred, that area of the preform will tend to become even smaller since deposition rate depends on target diameter, so that a local depression will subsequently have less glass deposited on it.

3. The effect of a turn-around depends on the blank diameter at the time the turn-around occurs and the blank diameter changes (grows) with time. Hence in varying the turn-around location, it is important to use a pattern which achieves as uniform a spacing of turn-arounds as possible throughout the deposition process, i.e., on a continuous basis throughout the process.

4. Because the traverse speed of the burner array is limited, there is only a limited number of jogs which can be completed before the diameter difference becomes noticeable and new turn-arounds are not having the same deposition pattern as earlier ones. Also, since the density of the deposited soot depends on traverse speed, under some circumstances the density variation at the turn-around due to double-heating may be aggravated at a rate faster than the rate at which additional jogs can help in improving uniformity.

These considerations can be successfully addressed by using a jog pattern which systematically varies the location of the turn-around points. A pattern which has been found to work successfully is illustrated in FIG. 7.

For ease of description, the pattern shown in this figure assumes a burner spacing of 100 millimeters, with each burner depositing soot on a 200 millimeter region of the blank centered on the burner's home position. Accordingly, when the burner is moving to the left, portions of the right hand half of the burner's 200 millimeter region receive soot from the burner's right hand neighbor, and when the burner is moving to the right, portions of the left hand half of the 200 millimeter region receive soot from the burner's left hand neighbor. That is, the peak-to-peak amplitude of the oscillation pattern is twice the burner spacing so that each region of the useable portion of the blank receives soot from two burners.

Figure 7:
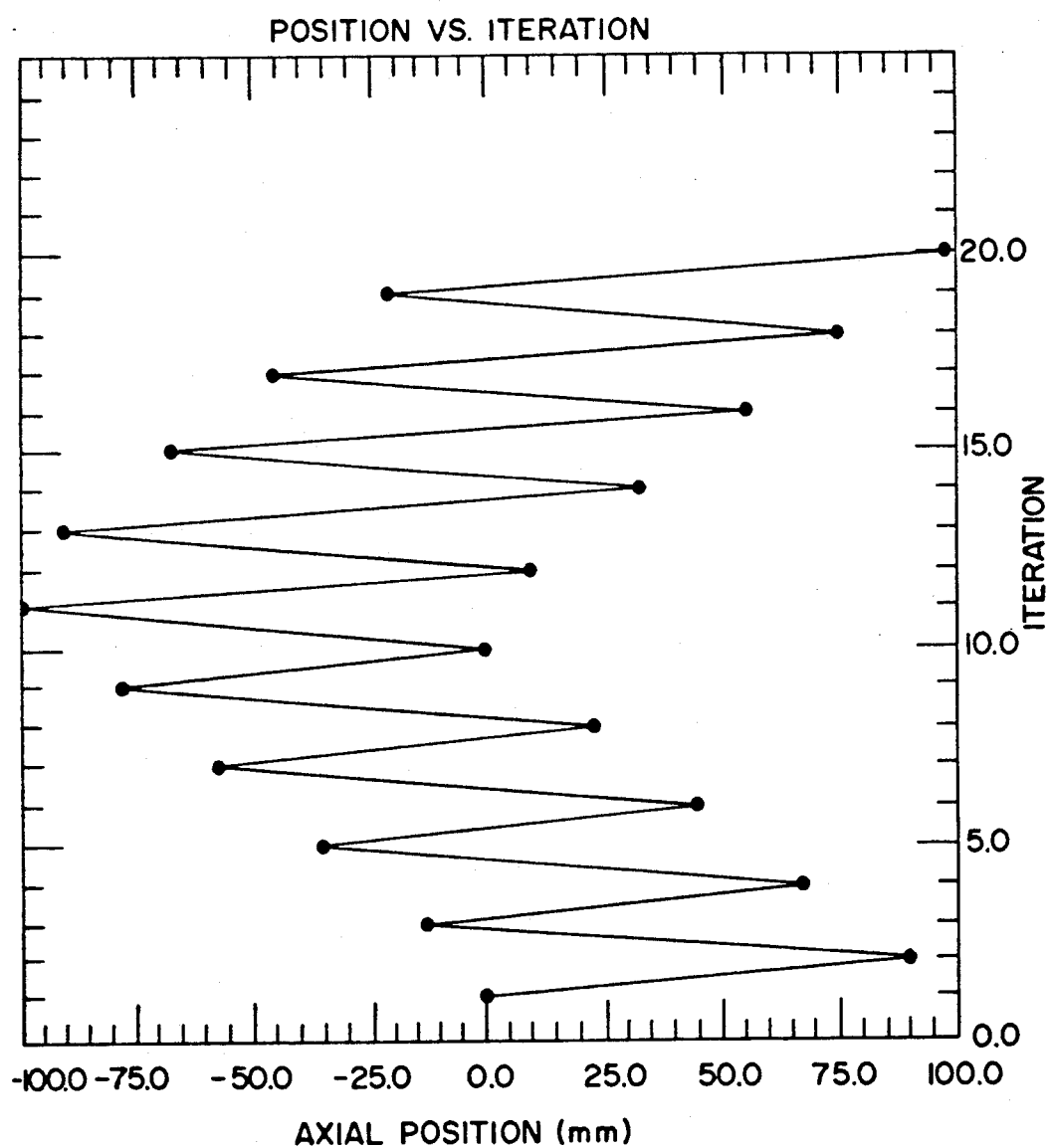
FIG. 7 is a graph illustrating a suitable burner array oscillation pattern for us with the present invention.

The location of the turn-around points is varied in the pattern of FIG. 7 by varying the size of the right hand jogs while holding the size of the left hand jogs constant. This results in the burner array drifting either to the left or to the right depending on whether the right hand jogs are smaller (left hand drift) or larger (right hand drift) than the left hand jogs. Moreover, the magnitude of the difference in size between the right and left hand jogs is systematically changed during the laydown process to further vary (interleave) the locations of the turn-around points.

The first twenty jogs of this pattern are shown in FIG. 7 where the left jogs are even numbered and all have the same size and the right jogs are odd numbered and are either D millimeters larger or smaller than the left jogs, depending on the direction of drift. A suitable value for D is 10% of the overall amplitude of burner's oscillation, i.e., 20 millimeters in FIG. 7. To achieve interleaving, the right hand jog is modified slightly on the 11th, 21st, 31st, 41st, 51st, 61st, 71st, and 81st jogs. In particular, the 11th, 31st, 51st, and 71st jogs modify the right jog by $-0.5$ D; to interleave exactly the previous 10 jogs; the 21st and 61st jogs modify the right jog by $-0.25$ D; and the 41st and 81st jogs modify the right jog by $-0.625$ D and $-0.875$ D, respectively, which brings the burner array back to its initial position shown in FIG. 7, whereupon the process is repeated again.

In practice, the foregoing pattern has been found to successfully solve the turn-around problem. Of course, other patterns, including patterns in which the turn-around points are randomly or quasi-randomly chosen, can be used in the practice of the invention.

During the laydown process, burners 13 generate a substantial amount of heat and thus a blower 49, located at the base of housing 33, is provided for cooling the various components of the apparatus. In particular, housing 33 includes suitable conduits to distribute the air provided by blower 49 so as to first cool housing protection blower 39 and then carriage 35 and its drive mechanism. The cooling air leaves the top of housing 33 through conduit 71, passes through and thus cools support housing 47, and finally leaves the system through main exhaust conduit 41 which is connected to suitable pollution abatement equipment. The amount of air flowing through the cooling system is controlled by means of a slot valve located at the top of housing 33.

The flow of air in burner-array/preform region 67 is controlled by means of honeycomb 55, diffuser 43, and collection tank 45, as well as by the general funnel shape of the internal walls of housing 33 in region 67. The air flowing through region 67 enters housing 33 through suitable inflow apertures formed in the walls of the housing opposite to diffuser 43.

Honeycomb 55 completely surrounds manifold 31 and is sealed to the internal walls of housing 33 by seals 73 when burners 13 are in their operative position (see FIG. 5). The honeycomb eliminates upstream turbulence from the air entering the burner-array/preform region and also causes that air to flow in a direction which is substantially perpendicular to the preform axis and substantially parallel to the burner flames. The honeycomb can be composed of a array of hexagonally-shaped apertures which have a width on the order of 0.25 inches and a depth on the order of 2.5 inches.

Diffuser 43 runs the full length of burner array 23 and is connected at its wide end to collection tank 45, which also runs the full length of he burners. The flow of air through the collection tank and thus the diffuser is controlled through exhaust valve 75 which connects the tank to main exhaust 41. The junction between the exhaust valve and the collection tank, as well as the junction between the bottom of the tank and its support base 79, preferably allows for some motion of the tank without leakage as the tank expands and contracts with changes in temperature. The use of teflon washers at these junctions provides a suitable method for allowing such motion to occur.

Tank 45 serves the important function of providing a nearly constant pressure along the opening to the diffuser, i.e., the tank serves as a pressure reservoir. To do so, the tank should have as a large a diameter as possible. Moreover, to minimize boundary layer separation as the exhaust air leaves diffuser 43 and enters tank 45, the diffuser should have a relatively small expansion angle, i.e., an expansion angle of less than about 6°.

In practice, a collection tank having a diameter of 30 inches and a diffuser having a width of 5 inches at the collection tank and a width of 2 inches at its entrance slot 81 has been found to work successfully. For this configuration and for the honeycomb described above, a variation in air flow in the region of preform 17 of 2.7% was found with burners 13 off. With the burners on, this variability increased to 5.6%. In both cases, the lowest air flows were found at the ends of the diffuser, the lowest air flow being at the bottom for the cold measurements and ar the top for the measurements with the burners on. The variability was found to be relatively independent of total air flow for flows in the range of 400-800 cubic feet per minute (cfm).

Preforms produced using the above air flow control system and a total air flow on the order of 1200 cfm have bee found to have a diameter variability on the order of 12-15%, with the bottom of the blank having a larger diameter than the top. To further reduce this variability, high output end heaters 77, located below burner array 23, have been used to provide relatively constant convective heating effects over the entire length of the preform.

Figure 8:
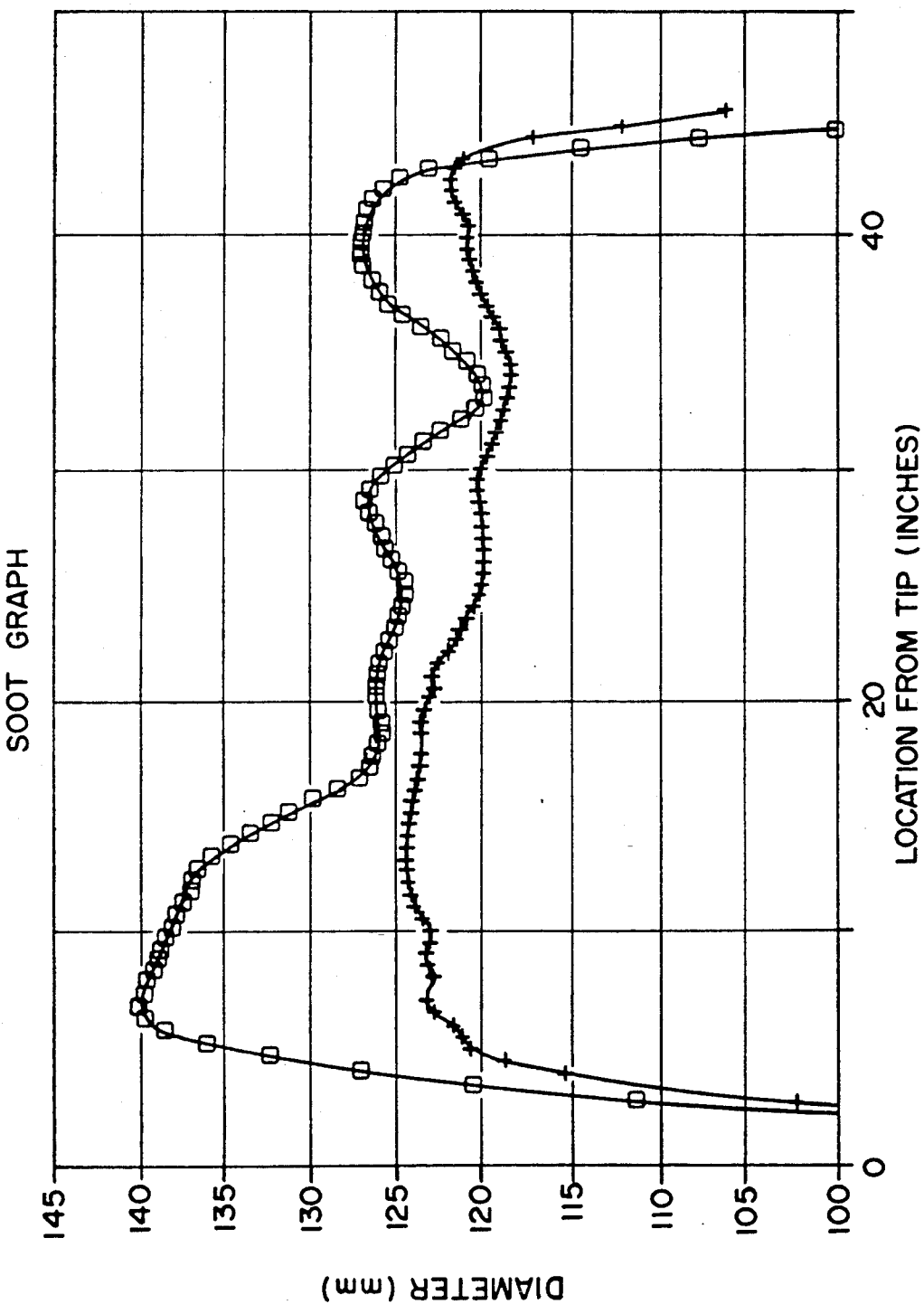
FIG. 8 is a soot graph which illustrates the improvement in uniformity achieved through the use of high output end heaters below the burner array to minimize the effects of thermal gradients along the length of the preform.

The effect of the end heaters is illustrated in the soot graph of FIG. 8. This graph plots preform diameter in millimeters versus distance from the tip (bottom) of the preform. The data points shown as squares are for a soot blank made with a low output end heater at the bottom of the blank, instead of high output end heaters 77, while those shown as crosses are for a blank made with the high output end heaters. The reduction in the diameter of the bottom portion of the blank as well as the overall increase in uniformity produced by the addition of burners 77 is evident from this data. In other experiments, the use of high output end burners was shown to reduce diameter variabilities to as low as 3.6%.

Experiments were also performed in which burners 77 were used with and without honeycomb 55. With the honeycomb omitted, the diameter of the lower 25% of the bank was found to be somewhat smaller than when the honeycomb was used. The overall effect, however, was not as great as that shown in FIG. 8, i.e., burners 77 were found to have a greater effect on uniformity than honeycomb 55.

Additional experiments were performed in which cane overcladding was performed using the apparatus and method of the present invention, and the resulting porous glass preforms were consolidated and then tested for axial variability. The experiments revealed that the axial variation in cane/clad diameter ratio for the consolidated blanks was surprisingly much smaller than the blank's axial variation in outside diameter. Specifically, the cane/clad variation was approximately $\frac{1}{3}$ of the diameter variation.

Similarly, when fiber was drawn from the consolidated blanks, it was found to have a cutoff wavelength variation which was approximately $\frac{1}{3}$ of that which would have been expected from the diameter variation of the consolidated blanks. This is an important result since finished fibers are graded by their cutoff wavelengths and thus the fact that cutoff wavelengths vary less than blank diameters when the present invention is used is of value from a fiber production point of view.

Although specific embodiments of the invention have been described and illustrated, it is to be understood that modifications can be made without departing from the invention's spirit and scope. For example, other means besides honeycomb 55, diffuser 43, and collection tank 45 can be used to control the flow of air in the burner-array/preform region of the apparatus. In particular, less than all of these components can be used to control air flow, e.g., honeycomb 55 can be omitted. Also, other air flow techniques, e.g., baffling and/or manifold systems, can be used to achieve the desired controlled air flow in the region of the burners and the preform.

Similarly, other means for providing relative oscillatory motion between the preform and the burner array besides those illustrated can be used in the practice of the invention. For example, rather than oscillating the burner array, the preform can be oscillated or a combination of array oscillation and preform oscillation can be used to achieve the desired uniformity along the length of the preform.

Of course, with such alternate oscillation schemes, the limits of relative motion between the burners of the array and the preform must be controlled so that each burner only deposits soot on a portion of the usable length of the preform. As with the array oscillation approach described above, these alternate oscillation schemes share the common characteristics that 1) soot is continuously deposited over substantially the entire usable length of the preform until the process is completed, and 2) the usable portion of the preform remains substantially cylindrical throughout the deposition process.

What is claimed is:

1. Apparatus for forming an elongated, substantially-porous, glass preform comprising:
   (a) first means for supporting the preform, maintaining the preform substantially free from unidirectional longitudinal motion and rotating the preform about its longitudinal axis;
   (b) an array of burners spaced from the preform, including at least two glass soot depositing burners, for depositing glass soot on the preform; and
   (c) second means for oscillating the array of burners along a path substantially parallel to the preform's longitudinal axis such that the travel of each burner in the array has a first limit in one direction and a second limit in the opposite direction, th distance between the first and second limits for each of the burners being less than the usable length of the preform, wherein said usable length of the preform is the length of said preform having substantially uniform properties and a substantially uniform diameter, and such that each of said soot depositing burners traverses and deposits soot on only a portion of said usable length, said means for oscillating further comprising means for varying the locations at which the array of burners changes directions.

2. The apparatus of claim 1 further comprising third means for producing a flow of air in the region of the preform and the array of burners which is substantially uniform over the length of the preform.

3. The apparatus of claim 2 wherein the third means includes means for removing air from the region of the preform and the array of burners, said means for removing having a length which is substantially equal to or greater than the length of the preform.

4. The apparatus of claim 3 wherein the means for removing includes a diffuser having an entrance slot whose length is substantially equal to or greater than the length of the preform.

5. The apparatus of claim wherein the diffuser is connected to a pressure reservoir.

6. The apparatus of claim 2 wherein the third means includes means for introducing air into the region of the preform and the array of burners, said means for introducing having a length which is substantially equal to or greater than the length of the preform.

7. The apparatus of claim 6 wherein the means for introducing includes a member having a honeycomb structure whose length is substantially equal to or greater than the length of the preform.

8. The apparatus of claim 1 further comprising means for directing the soot produced by the array of burners away from the preform.

9. The apparatus of claim 8 wherein the means for directing includes means for pivoting the array of burners about an axis substantially parallel to the longitudinal axis of the array.

10. The apparatus of claim 1 wherein the first means supports the preform in a substantially vertical orientation and wherein the apparatus includes at least one stationary heater located below the array of burners for minimizing the effects of thermal gradients along the length of the preform.

11. The apparatus of claim 1 wherein the burners in the burner array are equally spaced from one another.

12. The apparatus of claim 11 wherein the distance between the first and second limits for each of the burners is substantially equal to or greater than said burner spacing.

13. The apparatus of claim 12 wherein the distance between the first and second limits for each of the burners is about twice said burner spacing.

14. The apparatus of claim 1 wherein the length of the array of burners is substantially equal to the usable length of the preform.

15. The apparatus of claim 1 wherein the array of burners is a linear array.

16. The apparatus of claim 1 wherein the means for varying causes the array of burners to move a constant distance in one direction and a variable distance in the opposite direction.

* * * * *